United States Patent
Flint (10) Patent No.: US 6,975,366 B2
(45) Date of Patent: Dec. 13, 2005

(54) DIGITAL DISPLAY SYSTEM USING PULSED LASERS

(75) Inventor: Graham W. Flint, Albuquerque, NM (US)

(73) Assignee: General Atomics, San Diego, CA (US)

( * ) Notice: Subject to any disclaimer, the term of this patent is extended or adjusted under 35 U.S.C. 154(b) by 563 days.

(21) Appl. No.: 10/040,057

(22) Filed: Oct. 26, 2001

(65) Prior Publication Data

US 2002/0060753 A1 May 23, 2002

Related U.S. Application Data (60) Provisional application No. 60/265,405, filed on Jan. 31, 2001, provisional application No. 60/263,844, filed on Jan. 23, 2001, provisional application No. 60/243,906, filed on Oct. 26, 2000, and provisional application No. 60/243,900, filed on Oct. 26, 2000.

(51) Int. Cl.$^7$ .............................. H04N 9/31; H04N 5/74
(52) U.S. Cl. ....................... 348/744; 348/750; 348/759; 348/771
(58) Field of Search ................................ 348/744, 750, 348/755, 756, 757, 758, 759, 760, 764, 770, 771; 353/31, 34, 94; 389/237, 264, 238, 276, 291, 340; H04N 9/31, 5/74

(56) References Cited

U.S. PATENT DOCUMENTS

| | | | |
|---|---|---|---|
| 2,611,817 A | 9/1952 | Schwarz | |
| 2,731,511 A | 1/1956 | Wiesen | |
| 4,084,182 A | * 4/1978 | Maiman | 348/760 |
| 4,090,219 A | 5/1978 | Ernstoff et al. | |
| 5,212,582 A | 5/1993 | Nelson | |
| 5,452,024 A | 9/1995 | Sampsell | |
| 5,526,051 A | 6/1996 | Gove et al. | |
| 5,534,950 A | 7/1996 | Hargis et al. | |
| 5,624,437 A | * 4/1997 | Freeman et al. | 606/12 |
| 5,668,611 A | * 9/1997 | Ernstoff et al. | 348/771 |
| 5,704,700 A | * 1/1998 | Kappel et al. | 353/31 |
| 5,740,190 A | 4/1998 | Moulton | |
| 5,990,983 A | 11/1999 | Hargis et al. | |
| 6,154,259 A | 11/2000 | Hargis et al. | |
| 6,426,781 B1 | * 7/2002 | Lee | 348/750 |
| 6,483,556 B1 | * 11/2002 | Karakawa et al. | 348/750 |
| 6,636,274 B1 | * 10/2003 | Mazda et al. | 348/744 |
| 2004/0037462 A1 | * 2/2004 | Lewis et al. | 382/181 |

* cited by examiner

*Primary Examiner*—Sherrie Hsia
(74) *Attorney, Agent, or Firm*—Fitch, Even, Tabin & Flannery (57) ABSTRACT

An image projection system comprises a laser source that generates a series of periodic pulses having substantially uniform energy content, a spatial light modulator, and a modulator driver synchronized with the laser pulses so that transition intervals of the modulator elements occur in an interpulse period between first and second states of the modulator elements. Because the pulses are substantially equal in energy, and the transitions of the modulator elements occur in interpulse intervals, the collective energy delivered to any pixel in the system described herein during the period of one frame is a direct function of the number of pulses, which can be accurately controlled in a digital manner.

40 Claims, 3 Drawing Sheets

DIGITAL DISPLAY SYSTEM USING PULSED LASERS

CROSS-REFERENCE TO RELATED APPLICATION

Priority is hereby claimed to U.S. Provisional Application No. 60/243,906 filed Oct. 26, 2000, entitled MULTI-SCREEN LASER PROJECTION SYSTEM USING A SHARED LASER, U.S. Provisional Application No. 60/243,900 filed Oct. 26, 2000, entitled DIGITAL DISPLAY SYSTEM USING PULSED LASERS, U.S. Provisional Application No. 60/265,405 filed Jan. 31, 2001, entitled DIGITAL DISPLAY SYSTEM USING PULSED LASERS, and U.S. Provisional Application No. 60/263,844 filed Jan. 23, 2001, entitled DIGITAL DISPLAY SYSTEM USING PULSED LASERS, all of which are by the same inventor and all of which are incorporated by reference herein.

BACKGROUND OF THE INVENTION

1. Field of the Invention

This invention relates to digital projection systems that project modulated laser beams onto a screen.

2. Description of Related Art

While cinemas of the past have relied almost exclusively upon moving pictures embedded in film copies, in the future cinema will likely become entirely digital. For example, digital movies will likely be distributed in a digital format such as a computer file. A digital image format ensures consistency over time because unlike film, digital images do not "wear down". Furthermore, a digital format can be more easily combined with other information such as supplemental commercials or directed advertising. Generally, digital formats are a more cost-effective distribution method than film.

However, it has been difficult to develop practical and cost-effective projection systems. One such proposed alternative projection system utilizes a red laser, a green laser, and a blue laser, each of which are individually modulated in a series of "frames" and then projected onto a screen to create a full color image. In one such display architecture, the brightness distribution of the illuminating light includes brightness levels that follow a precise binary progression. Such systems, although theoretically feasible, are difficult to implement in the real world in a cost-effective manner. For example, in the above binary progression system it is necessary to create a discrete set of laser beams, each having an exact brightness relationship with the other. Such a binary progression of brightness levels is difficult to achieve in practice.

One obstacle to achieving a truly digital projector relates to the analog properties of many of the electrical, mechanical, and optical components used in a so-called digital system. For example, one known type of light modulator-a digital micromirror device (DMD)-operates by shuttering light using a two-dimensional array of extremely small mirrors. In principle, the length of time during which each micromirror is switched to the "on" position can be controlled in a precise matter. In practice, however a certain amount of time is required to transition between the "off" and the "on" states of each DMD micromirror. Although this transition time can be very short, the transition time can interfere with the gray level of the display (e.g. on the order of 10–20 microseconds) particularly when the image is "dark" such as when the requisite on-time becomes short.

SUMMARY OF THE INVENTION

A digital illumination system disclosed herein that comprises a pulsed laser source that provides a laser beam including a series of periodic pulses and an interpulse period between pulses, each pulse having substantially equal energy content. A spatial light modulator is arranged to receive the laser pulses from the pulsed laser source, the modulator including a plurality of elements each of which is configured in one of a first state, a second state, and a transition between the first state and the second state, the transition having an associated transition interval. A modulation driver is synchronized with the laser driver, the modulator driver controlling transitions between the first and second state of the elements, the transitions having a non-zero phase with reference to the laser pulses so that the transition intervals occur in interpulse periods. In one embodiment a projection system is provided including a screen and projection optics arranged to receive the modulated beam from the light modulator and project it onto the screen.

In some embodiments the pulsed laser source comprises a Q-switched laser. In another embodiment the pulsed laser source comprises a mode-locked laser, and in such an embodiment an optical switch is provided to switch the pulsed laser output of the mode-locked laser and provide the series of periodic pulses and the interpulse period between pulses.

To project color images, some embodiments include multiple laser sources that generate red, green and blue pulsed beams. Corresponding spatial light modulators are arranged to respectively modulate the pulsed beams. A beam combiner may be provided to combine the red, green, and blue beams. An embodiment is disclosed in which the red, green, and blue laser beams are generated from a single source, and therefore are synchronized with each other in frequency and phase, which can simplify design because the corresponding modulators can be identically synchronized.

The projection system disclosed herein can provide a cost-effective, true digital projection display system, which allows movies to be transferred in an electronic digital format, providing consistency in color rendering and image quality over time without the degradation experienced by film.

By precisely controlling the number of pulses displayed during a frame, and transitioning the modulators between pulses, true digital control of grayscale can be obtained for each color. In a multi-color display, the ability to accurately control grayscale of each color provides accurate and consistent mixing of colors at each pixel. The image processing required to provide grayscale can be straightforward; for example if 255 pulses are incident upon a modulator during a frame interval, then 8-bit color data corresponds exactly to the number of pulses that must be displayed to achieve that level of grayscale.

In one embodiment, a two-dimensional modulator array is used in which each modulator corresponds to each pixel on the screen in a one-to-one relationship. As compared with a scanning system, beam requirements in such a system are less stringent, thereby allowing lower cost optical systems. Furthermore, the less stringent beam requirements allow the system to be implemented with higher power, which means brighter projected images. Particularly, a diffraction limited beam is not required thereby simplifying the optics, allowing use of larger fibers, and a variety of other advantages.

A method is disclosed for digitally modulating a laser beam responsive to digital data that includes grayscale levels for each pixel in a frame, comprising generating a pulsed laser beam that includes a series of periodic light pulses each having an approximately equal energy content, and modulating the pulsed laser beam in a plurality of elements of a spatial light modulator to gate a number of pulses from each element corresponding to the grayscale level of the digital data for each pixel for each frame, including transitioning the elements substantially in an interpulse period between laser pulses, thereby providing a modulated beam. The modulated beam can then be projected onto a screen.

In a color embodiment, additional lasers and modulators are utilized. Color digital data comprises information including grayscale levels of the first color, and one or more additional colors for each pixel for each frame. Particularly, the color method includes generating an additional pulsed laser beam that includes a series of periodic light pulses for each color, each pulse providing an approximately equal energy content for that color, and respectively modulating each additional pulsed laser beam in a plurality of elements of an additional spatial light modulator to gate a number of pulses from each element corresponding to the grayscale level of said digital data for the respective colors for each pixel for each frame, including transitioning said elements substantially in an interpulse period between laser pulses, thereby providing one or more additional modulated beam. Full color is typically defined by red, green, and blue data, and accordingly in a full color system red, green, and blue pulsed lasers are modulated respectively in first, second, and third modulators to provide red, green, and blue modulated beams that can be combined and projected onto a screen.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Overview

A pulsed laser system disclosed herein modulates a uniform stream of short pulses (e.g., Q-switched laser pulses) that are electronically controlled, instead of the continuous-wave (cw) illumination that is more conventionally used. The stream of pulses is generated so as to be highly uniform in their energy content, to have a predictable period, and to have a pulse width that is less than a predictable amount. Because the pulses are substantially equal in energy, the collective energy delivered to any pixel in the system described herein during the period of one frame is a direct function of the number of pulses. Each modulator element is used like a gate that passes a discrete number of pulses. Because the pulses are synchronized with the modulator, the number of gated pulses that are projected can be accurately controlled, and therefore the total energy incident upon a pixel during a frame can be controlled in a digital manner.

As described herein, in order to provide digital cinematic imagery, the transition period (the period during which the state of an element of a light modulator is between "on" and "off") is synchronized with the interpulse time period, which is defined as the time period beginning just after one laser pulse ends and ending just before the next succeeding pulse begins. The system operates by clocking the modulator drivers synchronously with the laser drivers; specifically a clock signal for the laser drivers is sufficiently delayed from the clock signal from the modulator drivers so that when the next laser pulse arrives, each element in the modulator array has achieved a steady state condition either "on" or "off".

DESCRIPTION

This invention is described in the following description with reference to the Figures, in which like numbers represent the same or similar elements.

Figure 1:
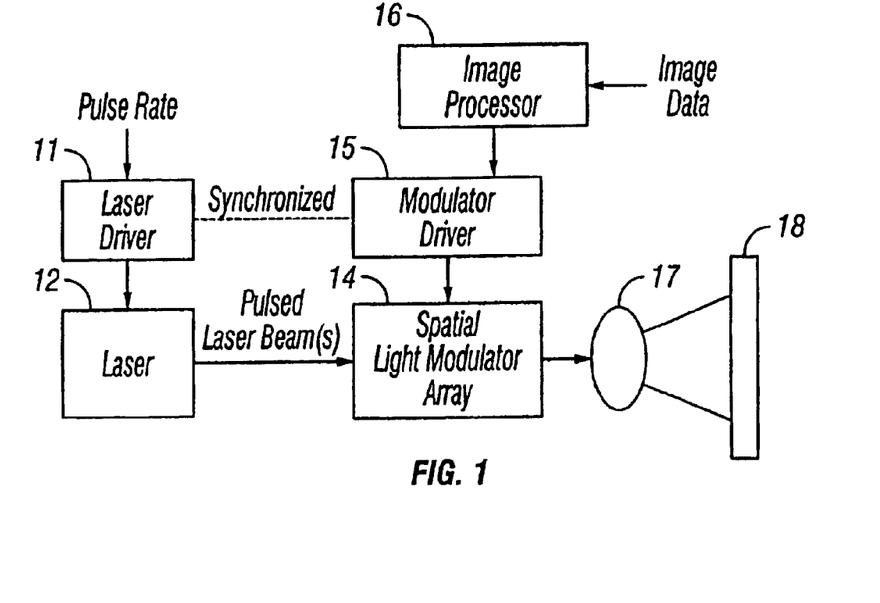
FIG. 1 is block diagram of an image display system that comprises a single pulsed laser system including a laser and a laser driver that pulses the laser at a selected pulse rate to generate a pulsed laser beam that is modulated by a spatial light modulator.

FIG. 1 is block diagram of an image display system that comprises a single pulsed laser system including a laser 11 and a laser driver 12 that pulses the laser at a selected pulse rate to generate a pulsed laser beam. In some embodiments such as disclosed in FIG. 3, the laser system may include a plurality of lasers that generate a corresponding plurality of laser beams, such as a red beam, a green beam, and a blue beam. The laser system provides a uniform stream of short pulses, such as shown in FIG. 2D and discussed in connection therewith. Particularly, the stream of pulses is generated so that the pulses are highly uniform in energy content, have a predictable period, and have a pulse width that is less than a predictable amount.

Any suitable pulsed laser system can be utilized, such as a Q-switched laser or a mode-locked laser. In one embodiment, the laser comprises a Q-switched laser that generates a series of pulses at a rate in the range of tens of kilohertz (e.g., 10–100 kHz) and therefore each pulse can be separately gated. In another embodiment, a mode-locked laser can be used in conjunction with an external optical switch, an example of which is discussed with reference to FIG. 5.

The pulsed laser beams from the laser system are applied to a spatial light modulator array 14 that is driven by a modulator driver 15, which in turn is controlled by a suitable image processor 16 responsive to image data that includes grayscale information for each color of each pixel for each frame. In one embodiment, the light modulator array 14 comprises a plurality of elements arranged in a two-dimensional, rectangular grid, each of which is individually controlled between a first state (e.g. "off") and a second state (e.g. "on"). The laser pulses from the laser 12 illuminate the entire light modulator array 14, and the resultant modulated beam is the combination of the element-modulated beams that are allowed to be transmitted ("gated") from each element. Projection optics 17 are arranged to project and image the modulated beam from the array 14 onto any suitable display system such as the screen 18, which may for example be a screen in a movie theatre.

In one embodiment, the modulator array comprises a DMD (digital micromirror device), which is available from Texas Instruments of Dallas, Tex. However other embodiments could utilize different types of light modulators. A DMD is a type of light modulator that includes a two-dimensional array of reflective elements (micromirrors) that are individually controlled between two states (i.e. positions). In a first state (which may be termed "off") a micromirror is tilted at a first angle that reflects the incident light out of the optical system or into a beam dump. In a second state (which may be termed "on"), the micromirror is tilted at a second angle that reflects the incident light toward the display surface. During operation, the modulated beam, which is the combination of light reflected from each of the "on" elements of the two-dimensional DMD array is imaged and projected upon a screen and each individual element of the DMD corresponds in a one-to-one relationship with each pixel on the screen. Accordingly, an image, which is defined by a two-dimensional grid of pixels, is produced by modulating each individual element of the modulator array to either a first or second state and then projecting the resultant modulated beam on the screen. Particularly, the DMD driver board receives image signals in a suitable format, and controls the individual micro-mirrors on the DMD to either an "on" state or an "off" state to provide the desired image. The modulated beam from the DMD is supplied to suitable projection optics and projected onto any suitable screen or other display system.

Figure 2A:
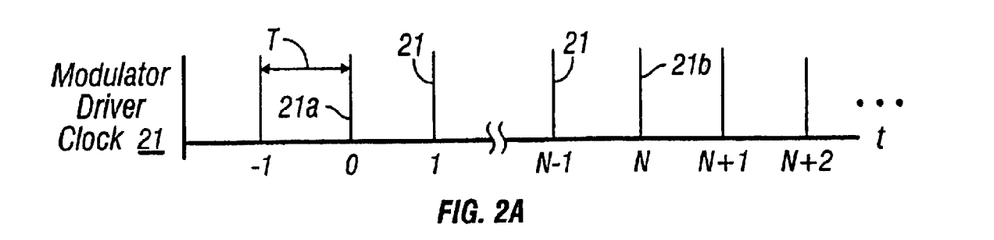
FIG. 2A shows a modulator driver clock signal that supplies an internal reference, for controlling the modulator drivers 15 to drive the modulator elements between the first and second states.
Figure 2B:
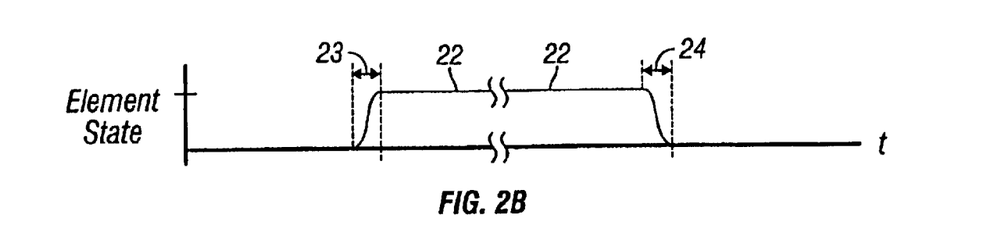
FIG. 2B is a graph that depicts the state of one modulator element in one example.
Figure 2C:
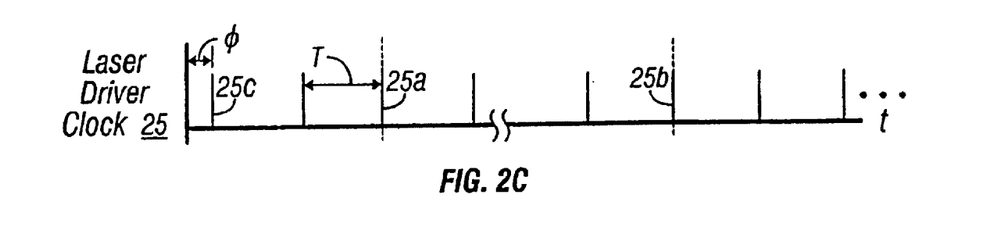
FIG. 2C is a graph that depicts a laser driver clock signal that is used by the laser driver to initiate the laser pulses.
Figure 2D:
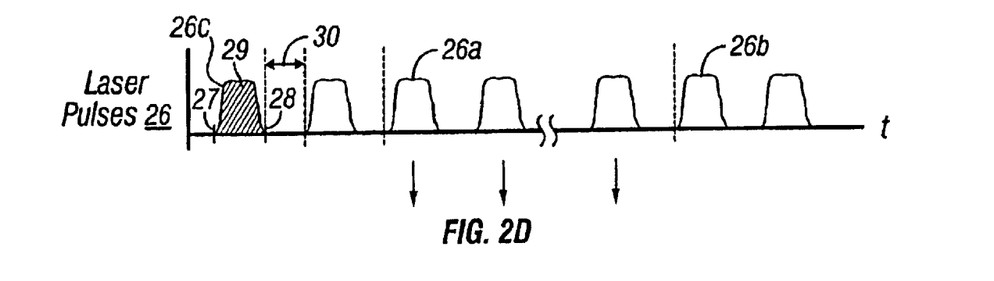
FIG. 2D is a graph of the amplitude of the laser pulses emitted by the laser.

FIGS. 2A–2E together form a timing diagram that illustrates one example of one element of a light modulator 14 (FIG. 1) in operation. FIG. 2A shows a modulator driver clock signal that supplies an internal reference at a selected frequency and phase, for controlling the modulator drivers 15 to drive the modulator elements between the first and second states. The modulator driver clock is defined by a series of periodic pulses 21 having a period T. Operations to switch the elements between "on" or "off" utilize this driver clock signal, subject to control from the image processor 16 (FIG. 1), in order to create the image specified by the image data.

FIG. 2B is a graph that depicts the state of one modulator element in an example as illustrated by a waveform 22. Although each element's steady state is "on" or "off"; there are transition intervals necessary to transition between the two states due to physical limitations on how quickly the modulator element can change states. In this example waveform 22, the driver clock pulse 21a at time zero (0) initiates a first transition to turn "on" the modulator element. After a first transition interval 23, the modulator element achieves the "on" state. The element remains on until at clock pulse 21b, a second transition is initiated to turn "off" the modulator element. After a second transition interval 24, the modulator element achieves the "off" state. The transition intervals are determined by device characteristics, and accordingly may vary between embodiments. In some devices the first and second transition intervals may be approximately equal; in other embodiments the first and second transition intervals may be substantially different. In such embodiments, the longest of the first and second transition intervals may be used to define the transition interval of the system in one embodiment.

FIG. 2C shows a laser driver clock signal 25 utilized by the laser driver 11 to initiate the laser pulses from the laser 12. Particularly, the laser driver 11 is synchronized with the modulator driver 15 to drive the laser 12 at the same frequency as the driver clock signal 21 that drives the modulator drivers and is synchronized therewith by any suitable type of connection. However, the laser driver signal 11 has a non-zero phase delay φ, as will be described, that ensures that the laser pulses are incident upon the modulator element only when the modulator element is substantially "on" or "off", and not during the transition intervals.

FIG. 2D is a graph of the amplitude of the laser pulses emitted by the laser 12 over time, and as shown in FIGS. 2C and 2D, each clock pulse 25 initiates a corresponding laser pulse 26. For example the clock pulse 25a initiates the laser pulse 26a substantially beginning at a begin time 27 and substantially ending at an end time 28. The total energy of each pulse is shown by the area under the graph of the pulse; for example the energy of the pulse 26c is shown by the area 29 under the graphed pulse, and outside the boundaries (i.e. outside the begin time 27 and end time 28) there is substantially no energy. The energy in each pulse is approximately uniform; i.e. the area under each pulse is substantially equal, which provides digital operation as described elsewhere in more detail. For most embodiments, the shape of the pulse is unimportant as long as the peak power does not exceed system limitation. For example the pulse may be regular, irregular, had multiple peaks, or even comprise a group of pulses from a mode-locked laser, such as described in more detail with reference to FIG. 5.

The interval between laser pulses, shown at 30 is termed the interpulse period 30. Specifically, the interpulse period 30 is defined between the end time 28 of one pulse and the start time of the next pulse. As will be described, the transition intervals 23 and 24 of the modulators (shown in FIG. 2B) are timed to fall within respective interpulse periods in order to ensure accurate digital grayscale.

Each of these laser pulses is generated by the laser 12 regardless of whether or not it will be displayed. Each of the laser pulses emitted by the laser 12 illuminate the modulator array 14 (FIG. 1), and accordingly each pulse illuminates each element. If the modulator element is "on", the illuminating pulse is gated (i.e. allowed to propagate on to the projection optics), but if the modulator element is off, the pulse is not allowed to propagate to the projection optics; for example it may be reflected or blocked.

Figure 2E:
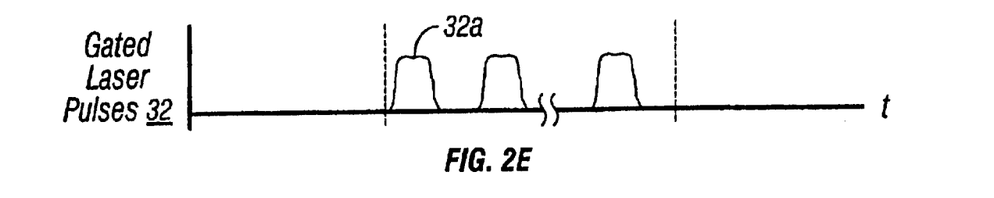
FIG. 2E is a graph of the amplitude of the laser pulses that are gated through the modulator element for display on the screen in one frame.

FIG. 2E is a graph of the amplitude of the laser pulses 32 that are gated through the modulator element for display on the screen in one frame. In other words, the timing diagram at 2E shows gated laser pulses 32 that are actually displayed during one frame because the modulator element is in the on state when the laser pulse illuminates it. For example, as shown in FIG. 2D, a first laser pulse 26a illuminates the modulator element after it has achieved the "on" state as shown by the waveform 22 in FIG. 2B, and therefore becomes a first gated laser pulse 32a. Each subsequent illuminating pulse is gated until the modulator driver 15 transitions the element state to the "off" state. Particularly, subsequent to the transition interval 24, an illuminating pulse 26b is blocked from the projection optics, and therefore is not gated. The gated laser pulses 32 shown in FIG. 2E will become part of the modulated beam emitted from the modulator array 14 (FIG. 1), and then projected onto a screen to make up one pixel of the image. In this example, the N gated pulses provided during the frame determine the grayscale level for that pixel and color. The image processor 16 controls the grayscale of each pixel and each color by selecting the number of pulses that are displayed in each frame. Image processing may be straight forward; for example if 255 laser pulses are available during one frame, then 8-bit grayscale data directly corresponds to the number of pulses necessary to create that grayscale level. Of course, other image data mappings may be used as appropriate for the particular hardware and data.

As can be seen from FIGS. 2B, 2D, and 2E, the timing of the laser pulses and the modulator drivers is such that each of the laser pulses is gated substantially in its entirety without being "cut off" by a transition interval, which would otherwise create inconsistencies in the digitally displayed information. Particularly, the laser driver clock 25 is controlled at a frequency and phase φ that creates laser pulses that are incident upon the modulator element only when the element is substantially either "on" or "off". In other words, the laser driver is controlled so that the laser pulses are not incident on the DMD element within the transition intervals.

Because each pulse supplies a uniform energy, by precisely controlling the number of pulses and timing the transition intervals of the modulators to fall within interpulse periods, the total energy on the screen is displayed in a digital fashion. The number of clock pulses in each waveform is determined by the image processor 16 responsive to the image data in such a way as to create the desired gray scale level. For example, in FIGS. 2A–2E, the number of pulses displayed is N, which determines the grayscale level of the pixel for that frame. Generally, the darkest grayscale level is obtained by gating only one pulse per frame, and the brightest grayscale level is obtained by gating all pulses available during the frame, the number of which may vary between embodiments.

In one example the laser 12 comprises a Q-switched laser and the light modulator array comprises a digital micromirror device (DMD). During the course of a frame, each micromirror element receives between 0 and 255 discrete pulses of each color that can be gated to a pixel; which yields 24-bit color (8 bits for each of red, green, and blue). The darkest grayscale level is obtained by gating only one pulse per frame, and the brightest grayscale level is obtained by gating all 255 pulses. Of course, zero pulses would produce an absence of color (black) for that frame and color.

In order to achieve this level of color fidelity with a refresh rate of 60 hertz, the pulsed laser 12 can operate at a pulse repetition frequency in the neighborhood of 16 kHz. The corresponding repetition frequencies required to achieve 27 bit or 30-bit color fall in the vicinity of 32 kHz and 64 kHz respectively. It is advantageous if the required frequency also corresponds to a frequency for which the lasers operate at their highest efficiency and exhibit their best pulse-to-pulse amplitude stability.

In the above example, for a pulse repetition rate of 16 kHz, the interval between successive pulses becomes 62.5 microseconds, while the switching period (the time between full "on" and full "off" of a micromirror) lies in the vicinity of 10–20 microseconds. Accordingly, in one example, to achieve the darkest gray level (i.e. a single pulse), the micromirror element is turned on before the pulse arrives, then is left open for a period of 10 microseconds, and then subsequently closed over the next 10–20 microseconds. Since the collective interval for performing these operations is only 30–50 microseconds (which is less than a 62.5 microsecond interpulse interval) it becomes a simple matter to synchronize a pulse train so as to deliver only a single pulse.

To deliver any number of pulses during a single frame interval requires that the "open time" of the micromirror be increased by a time that is equal to (62.5×N) microseconds. Some embodiments may deliver N pulses in a straightforward manner by simply turning the micromirror "on" in the beginning of an interval, and leaving it on for the number of microseconds required and then shutting it off until the next frame. In alternative embodiments, it may be advantageous to divide the total exposure for a frame into two or more groups. For example, if it is desired to switch on the micromirror element for 100 pulses during one frame, then as an alternative to displaying 100 contiguous pulses, two groups of fifty pulses may be displayed in the frame, or four groups of twenty five pulses, or five groups of twenty pulses, and so forth as appropriate.

Figure 3:
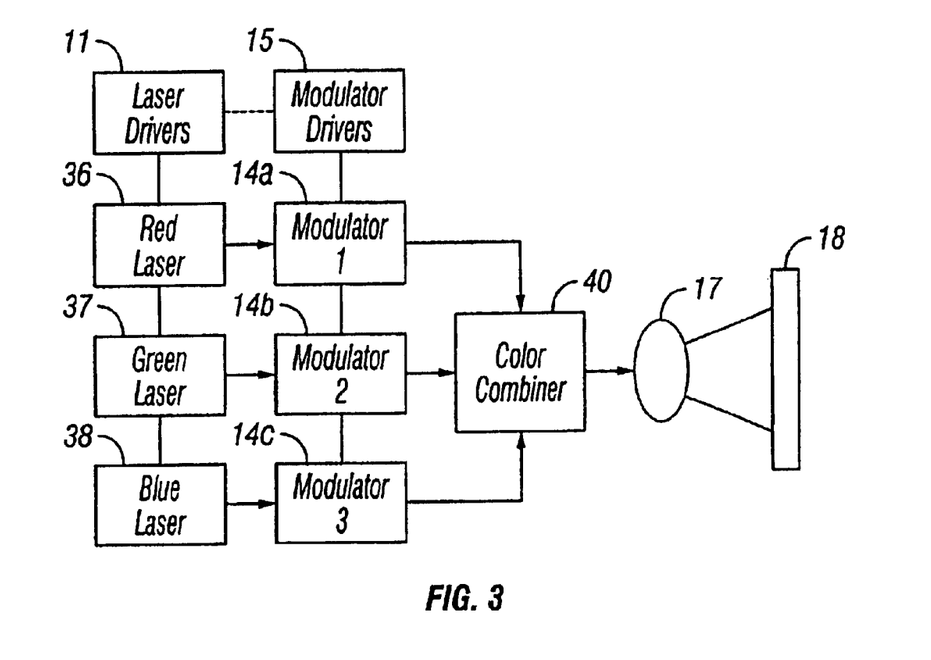
FIG. 3 is a block diagram of an embodiment that uses three separate pulsed lasers, including a pulsed red laser, a pulsed green laser 37, and a pulsed blue laser whose output beams are modulated in a first, second, and third light modulator array are then combined by a color combiner 40 into a combined beam.

Reference is now made to FIG. 3. The digital system described herein can be implemented in a wide variety of embodiments. One embodiment, shown in FIG. 3, uses three separate pulsed lasers, including a pulsed red laser 36, a pulsed green laser 37, and a pulsed blue laser 38 whose output beams are applied respectively to a first, second, and third light modulator array 14a, 14b, and 14c. As described elsewhere in more detail, the laser drivers 11 are frequency-synchronized with the modulator drivers 15, and include a phase delay so that the transitions of the modulators occur wholly within the interpulse intervals. The modulated red beam, the modulated green beam, and the modulated blue beams from the modulator arrays are then combined in any suitable color combiner 40 into a combined beam, and then projected onto the screen 18 using projection optics 17. In alternative embodiments additional pulsed lasers and modulators could be added, for example an additional blue laser may be added to increase the total blue power available, or an additional color such as infrared may be added.

One disadvantage of the embodiment of FIG. 3 is that the red, green, and blue lasers must be individually synchronized with their respective light modulators, which unfortunately requires additional hardware. Another disadvantage is that the color combiner is costly to implement, requiring additional optical elements (e.g. additional DMDs, X-prisms) to ensure that the three colors are precisely registered on top of each other so that they appear to be a single image. Even a slight misregistration can prove disastrous to the image.

Figure 4:
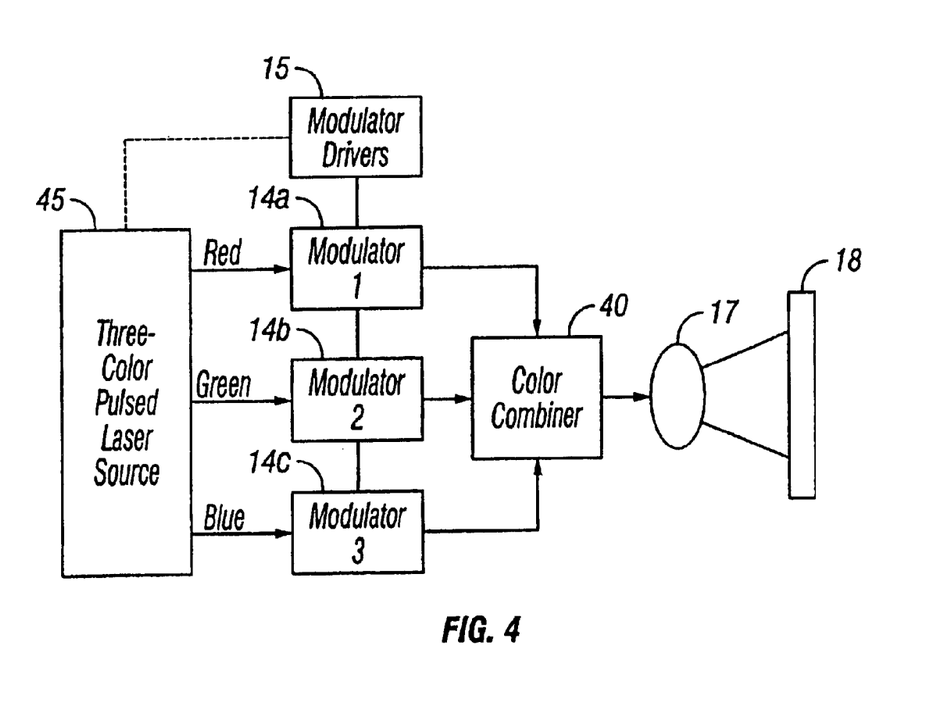
FIG. 4 is a block diagram of an alternative three-color projection system that utilizes a single laser to synchronously generate three pulsed beams.

FIG. 4 is a block diagram of an alternative three-color projection system. To address the problem of different pulse frequencies and phases between the lasers, the embodiment of FIG. 4 utilizes a single pulsed laser source 45 that supplies red, green, and blue laser beams pulsed in a synchronous fashion i.e. the pulses have substantially the same frequency and phase. One example of this laser is disclosed in U.S. Pat. No. 5,740,190, issued Apr. 14, 1998, entitled "Three-Color Coherent Light System" which is incorporated by reference herein. Generally, this system includes a main laser source that generates a laser beam that is subsequently optically processed to provide three separate beams: red, green, and blue. If the main laser source is operated in a pulsed manner then the red, green, and blue beams will also exhibit the same pulse characteristics, including the same pulse frequency and phase. In the U.S. Pat. No. 5,740,190, the main laser source is in the 1,000 to 1,100 wavelength region, and includes a means for generating a second harmonic, an optical parametric oscillator that provides a signal beam and an idler beam, means for splitting the second harmonic of the laser beam into a first beam that provides a source of coherent green light and a second beam that pumps the optical parametric oscillator to produce the signal and idler beams, means for generating the second harmonic of the signal beam as a source of coherent blue light, and means for generating the second harmonic of the idler beam as a source of coherent red light.

Using a pulsed laser source such as disclosed in U.S. Pat. No. 5,740,190 is advantageous because all of the pulsed beams are synchronous for all colors, and therefore the light modulators 14a, 14b, and 14c can all be operated in synchronous fashion with the laser, which has advantages in costs and simplification of design. It may also provide excellent image quality and more highly digital images and accurate color.

In one alternative embodiment the laser source 12 comprises a mode-locked laser. Because the pulses from a mode-locked laser are generated at a high frequency (e.g., in the range of hundreds of megahertz), the pulse-to-pulse interval of a mode-locked laser is shorter than the time interval in which a DMD mirror can switch from the "on" position to the "off" position, or vice versa. In this instance, therefore, it becomes necessary to break up the continuous stream of pulses from the mode-locked laser such that the DMD is illuminated with a sequence of pulse bursts.

Figure 5:
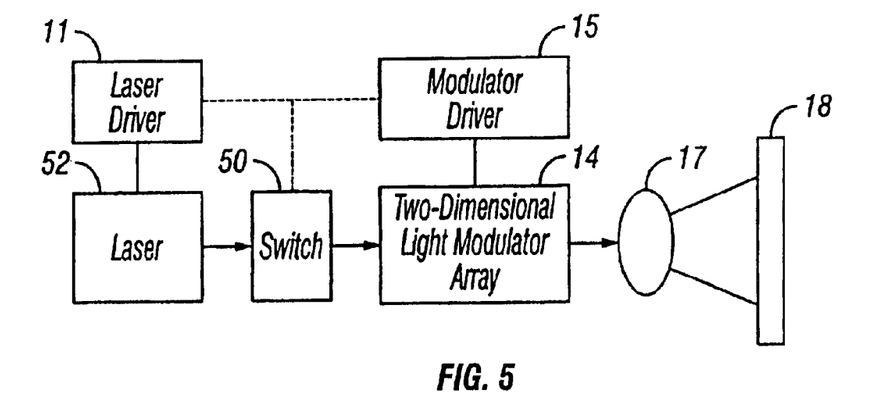
FIG. 5 is a block diagram of an alternative laser projection system that utilizes an external optical switch 50 to create a pulsed beam utilizing a high-frequency pulsed laser.

FIG. 5 is a block diagram of an alternative laser projection system that utilizes an external optical switch 50 such as an electro-optic switch, to pulse the beam from a laser 52 to create a pulsed beam that illuminates the modulator array 14 with a series of pulses that have a substantially uniform energy content and an interpulse period such as disclosed with reference to FIG. 2D. During the created interpulse period, the pulsed beam has substantially zero optical energy. The interpulse period is created to be as long, or longer than the longest transition period, in order to allow the modulator element to transition between the first and second state and vice versa.

In the embodiment of FIG. 5, the laser 52 may be a continuous wave (cw) laser, or a laser, such as a mode-locked laser that generates a series of pulses so quickly that the interpulse period is much smaller than the transition interval of the modulator elements. In an embodiment that utilizes a mode-locked laser and DMDs, the time interval between bursts is arranged to be longer than the mirror switching time of the DMDs, while the number of individual pulses within a burst is related to the minimum "on" interval of the mirror and the free-running pulse repetition rate of the mode-locked laser. Consistent with this arrangement, the aggregate multi-pulse energy within a burst of pulses becomes equivalent to that of a single pulse in the Q-switched laser.

Any suitable projection system can be utilized, such as conventional projection optics. An alternative for a projection system is disclosed in a U.S. patent application by the same inventor as herein, entitled Multi-Screen Laser Projection System Using a Shared Laser Source, Ser. No. 10/053,287, which is filed of even date herewith, ard incorporated by reference herein. In general, in that system the red, green, and blue beams are sequenced among several dimensional light modulators, each of which provides the image on a separate screen. One advantage of such a system is that it eliminates the need for a color combiner and the attendant problems of misregistration that go with it; and thereby provides a lower cost solution in addition to avoiding the problems attendant with color misregistration. The system also makes more efficient use of the laser energy. In one example, the laser produces a red, a green, and a blue beam, and a first modulator is utilized to modulate the image for a first screen, a second modulator is used for a second screen, and a third modulator is used for the third screen. In one example, a frame is displayed over three periods; particularly, each modulator is supplied sequentially with three colors. In one example, the red beam is sequentially supplied to the first, third, and then the second modulator. The green beam is sequentially supplied to the second, first, and the third modulator. And finally, the blue beam is supplied to the third, then the second, then the first modulator.

In addition to its application to laser digital cinema, the basic concept of using a spatial light modulator in conjunction with a synchronized pulse train to provide digital illumination has application in numerous other fields. Particularly the concept can be used in any light controlling process wherein a specific (digitally-quantized) amount of light is to be propagated through a system to an object. For example, in the printing industry it is sometimes desirable to transmit light in a digital fashion so as to establish either a precisely defined set of gray scales or a precisely defined ratio of several discrete colors on the object to be printed upon. In the context of the present disclosure, this can be achieved by, for example, gating an substantially equal-energy pulse train by way of a binary, or a quasi-binary optical shutter. In some embodiments, such a shutter could be singular in nature; in other embodiments multiple shutters could be arrayed either in a one-dimensional array or a two-dimensional array. Applications which potentially could benefit from a pulse gated system of the type described include the fields of printing, labeling, photo imaging, and optical data storage, to name but a few.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A method of digitally modulating a laser beam responsive to digital data that includes a grayscale level, comprising:
   generating a pulsed laser beam that includes a series of periodic light pulses each having an approximately equal energy content; and
   modulating said pulsed laser beam in an element of a spatial light modulator to gate a number of pulses corresponding to the grayscale level of said digital data, including transitioning said element substantially in an interpulse period between laser pulses.

2. The method of claim 1 further comprising projecting said modulated beam from said laser element onto a screen.

3. The method of claim 1 wherein said digital data comprises color information including grayscale levels of a first color, a second color and a third color, wherein said laser pulses have the first color, further comprising:
   generating a second pulsed laser beam that includes a series of periodic light pulses having the nd color, each pulse providing an approximately equal energy content;
   modulating said second pulsed laser beam in an element of a second spatial light modulator to gate a number of pulses corresponding to the grayscale level of said digital data for the second color, including transitioning said element substantially in an interpulse period between laser pulses,
   generating a third pulsed laser beam that includes a series of periodic light pulses having the third color, each pulse providing an approximately equal energy content; and modulating said third pulsed laser beam in an element of a third spatial light modulator to gate a number of pulses corresponding to the grayscale level of said digital data for the third color, including transitioning said element substantially in an interpulse period between laser pulses.

4. The method of claim 3 wherein said pulsed laser beam is red, said second pulsed laser beam is green, and said pulsed third laser beam is blue, and further comprising combining the red, green, and blue modulated beams to provide a full color modulated beam.

5. The method of claim 1 wherein the generating step further comprises:
generating the pulsed laser beam at a constant pulse repetition rate.

6. The method of claim 1 wherein the modulating stop further comprises:
modulating said pulsed laser beam in the element of the spatial light modulator to gate the number of pulses corresponding to the grayscale level of said digital data for projection, and bo not gate a number of other pulses of the pulsed light beam, the number of other pulses not to be projected.

7. A method of digitally modulating a laser beam responsive to digital data that includes grayscale levels for each pixel in a frame, comprising:
generating a pulsed laser beam that includes a series of periodic light pulses each having an approximately equal energy content; and
modulating said pulsed laser beam in a plurality of elements of a spatial light modulator to gate a number of pulses from each element corresponding to the grayscale level of said digital data for each pixel for each frame, including transitioning said elements substantially in an interpulse period between laser pulses, thereby providing a modulated beam.

8. The method of claim 7 further comprising projecting said modulated beam onto a screen.

9. The method of claim 7 wherein said digital data comprises color information including grayscale levels of a first color, a second color, and a third color for each pixel for each frame, wherein said laser pulses have the first color, further comprising:
generating a second pulsed laser beam that includes a series of periodic light pulses having the second color, each pulse providing an approximately equal energy content;
modulating said second pulsed laser beam in a plurality of elements of a second spatial light modulator to gate a number of pulses from each element corresponding to the grayscale level of said digital data for the second color for each pixel for each frame, including transitioning said elements substantially in an interpulse period between laser pulses, thereby providing a second modulated beam;
generating a third pulsed laser beam that includes a series of periodic light pulses having the third color, each pulse providing an approximately equal energy content; and
modulating said third pulsed laser beam in a plurality of elements of a third spatial light modulator to gate a number of pulses from each element corresponding to the grayscale level of said digital data for the third color for each pixel for each frame, including transitioning said elements substantially in an interpulse period between laser pulses, thereby providing a third modulated beam.

10. The method of claim 1 wherein said pulsed laser beam is red, said second pulsed laser beam is green, and said third pulsed laser beam is blue, and further comprising combining the red, green, and blue modulated beams to provide a full color modulated beam.

11. The method of claim 7 wherein the generating step further comprises:
generating the pulsed laser beam at a constant pulse repetition rate.

12. The method of claim 7 wherein the modulating step further comprises:
modulating said pulsed laser beam in the plurality of elements of the spatial light modulator to gate the number of pulses from each element corresponding to the grayscale level of said digital data for each pixel for each frame for projection, and to not gate a number of other pulses of the pulsed light beam for each pixel for each frame, the number of other pulses not to be projected.

13. A digital illumination system comprising:
a pulsed laser source that provides a laser beam including a series of periodic pulses and an interpulse period between pulses, each pulse having substantially equal energy content;
a spatial light modulator that receives said laser pulses from said pulsed laser source, said modulator including a plurality of elements each of which is configured in one of a first state, a second state, and a transition between said first state and said second state, said transition having an associated transition interval;
a modulation driver synchronized with a laser driver, said modulator driver controlling transitions between said first and second state of said elements, said transitions having a non-zero phase with reference to said laser pulses so that said transition intervals occur in interpulse periods; and
an optical system for propagating a first modulated laser beam from the light modulator.

14. The digital illumination system of claim 13 wherein said pulsed laser source comprises a Q-switched laser.

15. The digital illumination system of claim 13 wherein said pulsed laser source comprises a mode-locked laser, and further comprising an optical switch arranged to switch the pulsed laser output of said mode-locked laser and provide said series of periodic pulses and said interpulse period between pulses.

16. The digital illumination system of claim 13 wherein said spatial light modulator comprises a DMD array.

17. The digital illumination system of claim 13 further comprising:
a second pulsed laser source and a second spatial light modulator arranged to modulate the laser beam from said second pulsed laser to provide a second modulated beam;
a third pulsed laser source and a third spatial light modulator arranged to modulate the laser beam from said third pulsed laser to provide a third modulated beam; and
a beam combiner that combines the first, second, and third modulated beams.

18. The digital illumination system of claim 17 wherein said pulsed laser source provides red light said second pulsed laser source provides green light and said third pulsed source provides blue light.

19. The digital illumination system of claim 13 wherein said pulsed laser source provides a plurality of synchronized pulsed laser beams including a first, second, and third laser beam, said laser beams being synchronized with each other to provide a serfs of pulses having the substantially same frequency and phase, said spatial light modulator arranged to modulate said first laser beam to provide the first modulated beam and further comprising a second spatial light modulator arranged to modulate said second laser beam to provide a second modulated beam; and a third spatial light modulator arranged to modulate the third laser beam, wherein said spatial light modulator, said second spatial light modulator, and said third spatial light modulator are synchronized with said plurality of pulsed laser beams.

20. The digital illumination system of claim 13 further comprising a projecting system including a screen and projection optics arranged to receive the modulated beam from the light modulator and project it onto the screen.

21. The digital illumination system of claim 13 wherein the pulsed laser source provides the laser beam at a constant pulse repetition rate.

22. The digital illumination system of claim 13 wherein the modulation driver controls the transitions between said first and said second state of said elements to gate a number of pulses of said laser pulses received at the spatial light modulator from each of said elements corresponding to a grayscale of digital data.

23. The digital illumination system of claim 22 wherein the modulation driver controls the transitions between said first and said second state of said elements to gate the number of pulses of said laser pulses received at the spatial light modulator from each of said elements corresponding to the grayscale of the digital data for projection to the optical system and to not gate a number of other pulses received at the spatial light modulator, the number of other pulses not to be projected to the optical system.

24. A digital projection system for projecting an image, comprising:
a pulsed laser source that controls the laser to provide a pulsed laser beam including a series of periodic light pulses each having an approximately equal energy content, and an interpulse period between pulses during which substantially no fight energy is emitted;
an image processor coupled to receive image data;
a modulator driver coupled to said image processor, said modulator driver being frequency-synchronized with said pulsed laser source with a non-zero phase delay with respect to said pulsed laser source;
a spatial right modulator array coupled to said modulator driver, said army including a plurality of elements arranged to be illuminated by laser pulses from said pulsed laser source, each element configured in one of a first state, a second state that gates an illuminating pulse to provide a gated pulse, and a transition that has an associated transition interval between said first state and said second state, wherein said phase delay is selected so that transition intervals of modulator elements occur substantially in the interpulse period between light pulses, said modulator array outputting a modulated beam that comprises a plurality of gated pulses; and
a projection system that projects said modulated beam to provide an image.

25. The digital projection system of claim 24 wherein said pulsed laser source comprises a Q-switched laser.

26. The digital projection system of claim 24 wherein said pulsed laser source comprises a mode-locked laser, and further comprising an optical switch arranged to switch the pulsed laser output of said mode-locked laser and provide said series of periodic pulses and said interpulse period between pulses.

27. The digital projection system of claim 24 wherein said spatial light modulator comprises a DMD array.

28. The digital projection system of claim 24 wherein said pulsed laser source provides red light, and further comprising:
a second pulsed laser source that provides green light and a second spatial light modulator arranged to modulate the laser beam from said second pulsed laser to provide a green modulated beam;
a third pulsed laser source that provides blue light and a third spatial light modulator arranged to modulate the laser beam from said third pulsed laser to provide a blue modulated beam; and
a beam combiner that combines the red, green, and blue modulated beams to provide a single modulated beam supplied to said projection system.

29. The digital illumination system of claim 24 wherein said pulsed laser source provides a plurality of synchronized pulsed laser beams including a first, second, and third laser beam, each providing a different color, said laser beams being synchronized with each other to provide a series of pulses having the substantially same frequency and phase, said spatial light modulator arranged to modulate said first laser beam to provide the first modulated beam and further comprising a second spatial light modulator arranged to modulate said second laser beam to provide a second modulated beam; and a third spatial light modulator arranged to modulate the third laser beam, wherein said spatial light modulator, said second spatial light modulator, and said third spatial light modulator are synchronized with said plurality of pulsed laser beams.

30. The digital projection system of claim 24 wherein the pulsed laser source controls the laser to provide the pulsed laser beam at a constant pulse repetition rate.

31. The digital illumination system of claim 24 wherein said modulator array outputs said modulated beam that comprises the plurality of gated pulses, where a number of gated pulses from each element corresponds to a grayscale of digital data of each pixel of the image.

32. A digital projection system, comprising:
laser means for generating a pulsed laser beam including a series of periodic light pulses each having an approximately equal energy content and an interpulse period between pulses during which substantially no light energy is emitted;
means for modulating said pulsed laser beam to provide a modulated laser beam responsive to image data, including a spatial light modulator that has a plurality of elements arranged to be illuminated by said pulsed laser beam;
means for synchronizing a transition of said elements with said laser pulses so that transition intervals of said modulator elements occur substantially in the interpulse period between light pulses; and
means for projecting said modulated beam.

33. The digital projection system of claim 32 wherein said modulating means comprises an image processor coupled to receive image data and a modulator driver coupled to said image processor, said modulator driver frequency-synchronized with said laser means with a non-zero phase delay with respect to said laser means.

34. The digital projection system of claim 32 wherein said projecting means includes projection optics for projecting said modulated beam on a screen to provide an image.

35. The digital projection system of claim 32 wherein said spatial light modulator comprises a DMD array.

36. The digital projection system of claim 32 wherein:

said laser means further includes means for generating a second pulsed laser beam and a third pulsed laser beam;

said modulating means further includes a second and a third spatial light modulator arranged respectively to modulate said second and third pulsed laser beams to provide second and third modulated beams;

said synchronizing means further includes means for synchronizing a transition of the elements of said second and third modulators respectively with the laser pulses in said second and third laser beams so that transition intervals of said modulator elements occur substantially in the interpulse period between light pulses; and said projecting means includes means for projecting said second and third modulated beams.

37. The digital projection system of claim 36 wherein said pulsed laser beam is red, said second pulsed laser beam is green, and said third pulsed laser beam is blue, and further comprising a beam combiner that combines the red, green, and blue modulated beams to provide a single modulated beam.

38. The digital projection system of claim 32 wherein the laser means comprises:

laser means for generating the pulsed laser beam at a constant pulse repetition rate.

39. The digital projection system of claim 32 wherein the means for modulating comprises:

means for modulating said pulsed laser beam to gate a number of pulses from each modulator element corresponding to a grayscale level of a respective pixel of said image data to provide the modulated laser beam responsive to the image data.

40. The digital projection system of claim 39 wherein the means for modulating comprises:

means for modulating said pulsed laser beam to gate the number of pulses from each modulator element corresponding to the grayscale level of the respective pixel of said image data to provide the modulated laser beam responsive to the image data and to not gate a number of other pulses of said pulsed laser beam from each modulator element, the number of other pulses not to be projected.

* * * * *

UNITED STATES PATENT AND TRADEMARK OFFICE
CERTIFICATE OF CORRECTION

PATENT NO. : 6,975,366 B2  
DATED : December 13, 2006  
INVENTOR(S) : Flint, Graham W.

It is certified that error appears in the above-identified patent and that said Letters Patent is hereby corrected as shown below:

Column 10,  
Line 55, "nd" should be -- second --.

Column 11,  
Line 15, "stop" should be -- step --.  
Line 20, "bo" should be -- to --.

Column 12,  
Line 1, "1" should be -- 9 --.

Column 13,  
Line 3, "serfs" should be -- series --.  
Line 47, "right" should be -- light --.  
Line 48, "army" should be -- array --.

Signed and Sealed this

Thirteenth Day of June, 2006

JON W. DUDAS  
*Director of the United States Patent and Trademark Office*

UNITED STATES PATENT AND TRADEMARK OFFICE
CERTIFICATE OF CORRECTION

| | |
|---|---|
| PATENT NO. | : 6,975,366 B2 |
| APPLICATION NO. | : 10/040057 |
| DATED | : December 13, 2005 |
| INVENTOR(S) | : Flint, Graham W. |

It is certified that error appears in the above-identified patent and that said Letters Patent is hereby corrected as shown below:

<u>Column 10,</u>
Line 55, "nd" should be -- second --.

<u>Column 11,</u>
Line 15, "stop" should be --step--.
Line 20, "bo" should be --to--.

<u>Column 12,</u>
Line 1, "1" should be -- 9 --.

<u>Column 13,</u>
Line 3, "serfs" should be -- series --.
Line 47, "right" should be -- light --.
Line 48, "army" should be -- array --.

This certificate supersedes certificate of correction issued June 13, 2006.

Signed and Sealed this

Twenty-second Day of August, 2006

JON W. DUDAS
*Director of the United States Patent and Trademark Office*